United States Patent [19]

Edgar et al.

[11] Patent Number: 5,554,818
[45] Date of Patent: Sep. 10, 1996

[54] LITHIUM WATER REACTOR

[75] Inventors: Barry D. Edgar; Timothy Jone, both of Fareham, United Kingdom

[73] Assignee: The Marconi Company Limited, Middlesex, United Kingdom

[21] Appl. No.: 664,050

[22] Filed: Feb. 14, 1991

[30] Foreign Application Priority Data

Mar. 26, 1990 [GB] United Kingdom ............... 9006705

[51] Int. Cl.⁶ .................................................. F42B 12/00
[52] U.S. Cl. .................................. 102/364; 149/108.2
[58] Field of Search ................................ 149/87, 108.2; 102/364

[56] References Cited

U.S. PATENT DOCUMENTS

| | | | |
|---|---|---|---|
| 3,153,902 | 10/1964 | Morrell | 60/35.4 |
| 3,156,595 | 11/1964 | Camp et al. | 149/87 |
| 3,257,802 | 6/1966 | Kaufman | 60/35.4 |
| 3,506,086 | 4/1970 | McGann et al. | 181/0.5 |
| 3,697,239 | 10/1972 | Schroder | 44/3 R |
| 3,811,422 | 5/1974 | Olson | 126/263 |
| 3,964,416 | 6/1976 | Kiraly et al. | 114/20 A |
| 4,619,722 | 10/1986 | Marion | 149/41 |
| 4,698,974 | 10/1987 | Wood | 60/673 |
| 4,815,386 | 3/1989 | Dillard et al. | 102/364 |
| 4,960,564 | 10/1990 | Sutula et al. | 149/108.2 X |

FOREIGN PATENT DOCUMENTS

| | | |
|---|---|---|
| 0295136 | 12/1988 | European Pat. Off. . |
| 908383 | 10/1962 | United Kingdom . |
| 963310 | 9/1963 | United Kingdom . |
| 1010453 | 11/1965 | United Kingdom . |
| 1040183 | 8/1966 | United Kingdom . |
| 1224633 | 3/1971 | United Kingdom . |
| 2168968 | 7/1986 | United Kingdom . |

*Primary Examiner*—Peter A. Nelson
*Attorney, Agent, or Firm*—Spencer & Frank

[57] ABSTRACT

A lithium-water reactor for use in a motor, comprises a combustion chamber having means for spraying water onto a charge of lithium so as to cause combustion. The lithium can be provided as separate body or coating on the wall of the combustion chamber and conveniently includes a combustion initiator. The motor can be used in a torpedo propulsion unit, or any other marine application requiring an energy source.

11 Claims, 5 Drawing Sheets

LITHIUM WATER REACTOR

FIELD OF THE INVENTION

The present invention relates to a reactor for reacting lithium with water. Such a reaction might find use in a motor utilising lithium as an energy source.

BACKGROUND OF THE INVENTION

Propulsion units using lithium-water reactors have been proposed previously but problems have been encountered in the start up and maintenance of combustion. Earlier workers have sought to overcome these problems by spraying molten lithium into a combustion chamber at the same time that water is injected. This introduces complexity into the design of the motor.

The present invention arose in an attempt to provide a lithium-water reactor of simplified design which does not suffer from the above mentioned problems and which contains the lithium fuel in a discrete body within a combustion chamber.

SUMMARY OF THE INVENTION

In accordance with the present invention, there is provided a reactor comprising a combustion chamber including means for introducing water from outside the chamber on to a charge of lithium in a substantially discrete body inside the chamber so as to cause combustion thereof.

It is preferred that some means is provided to initiate combustion of the lithium. This can comprise a heat source such as a pyrotechnic device or an igniter comprising a highly reactive mixture of lithium in a sodium and/or potassium matrix or a solid oxidant e.g. ammonium nitrate crystals.

The lithium charge can constitute a separate body within the combustion chamber or can be arranged on the inside wall of the chamber. When the lithium charge is present as a separate body, the charge can typically be refreshed or renewed by the introduction of fresh fuel slurry or by extrusion into a fuel can.

It is also preferred that a secondary water injection system is provided to generate steam within the reactor.

In particularly preferred embodiment, the lithium charge is provided in a container which is conveniently permeable so as to allow containment of molten lithium while permitting water and hydroxide or oxide products to escape.

The lithium charge can conveniently contain aluminium and/or magnesium in the form of particles or as a cast-in wire. This stabilises the charge structurally and assists in heat transfer and energy production.

BRIEF DESCRIPTION OF DRAWINGS

The present invention will now be described, by way of example, with reference to the accompanying drawings in which.

DESCRIPTION OF PREFERRED EMBODIMENTS

Figure 1:
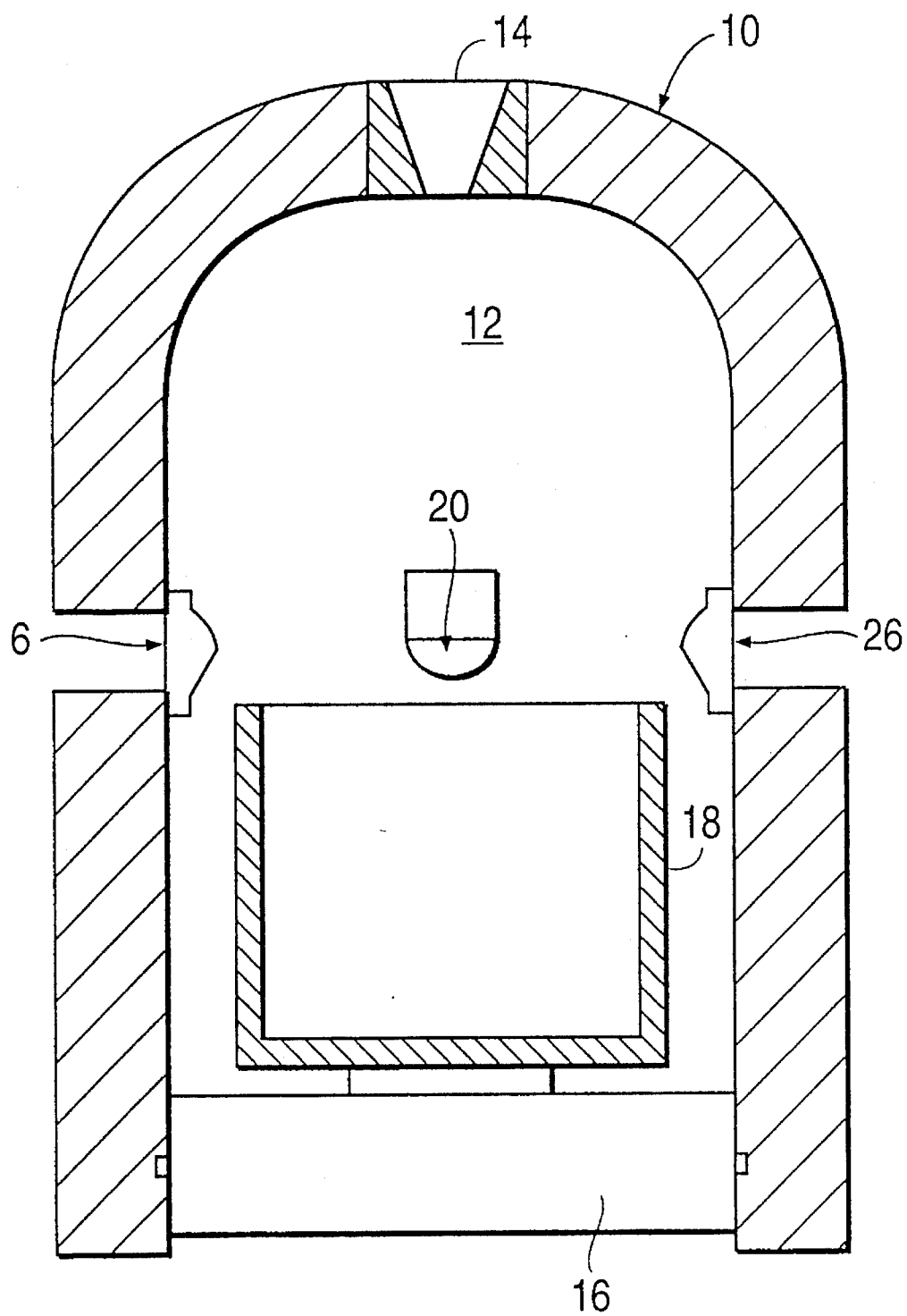
FIGS. 1, 2, 3 and 4 show cross section diagrammatic views of different embodiments of the invention.

Referring now to FIG. 1, the reactor shown therein comprises a pressure body 10 defining a combustion chamber 12. An exhaust vent 14 is provided at an upper region of the body 10 and a base member 16 is sealed into the lower region of the body 10. A fuel can 18 is connected to the base 16 and serves to locate a lithium charge within the chamber 12. A main spray nozzle 20 is provided in the wall of the pressure body 10 and is arranged to spray water directly onto the lithium charge in the can 18. Secondary nozzles 26 are provided to allow a further spray of water to be directed into the chamber 12 independently of that from the nozzle 20 although it is not necessary that this spray should impinge upon the charge and merely serves to dilute the combustion products and create steam.

Figure 2:
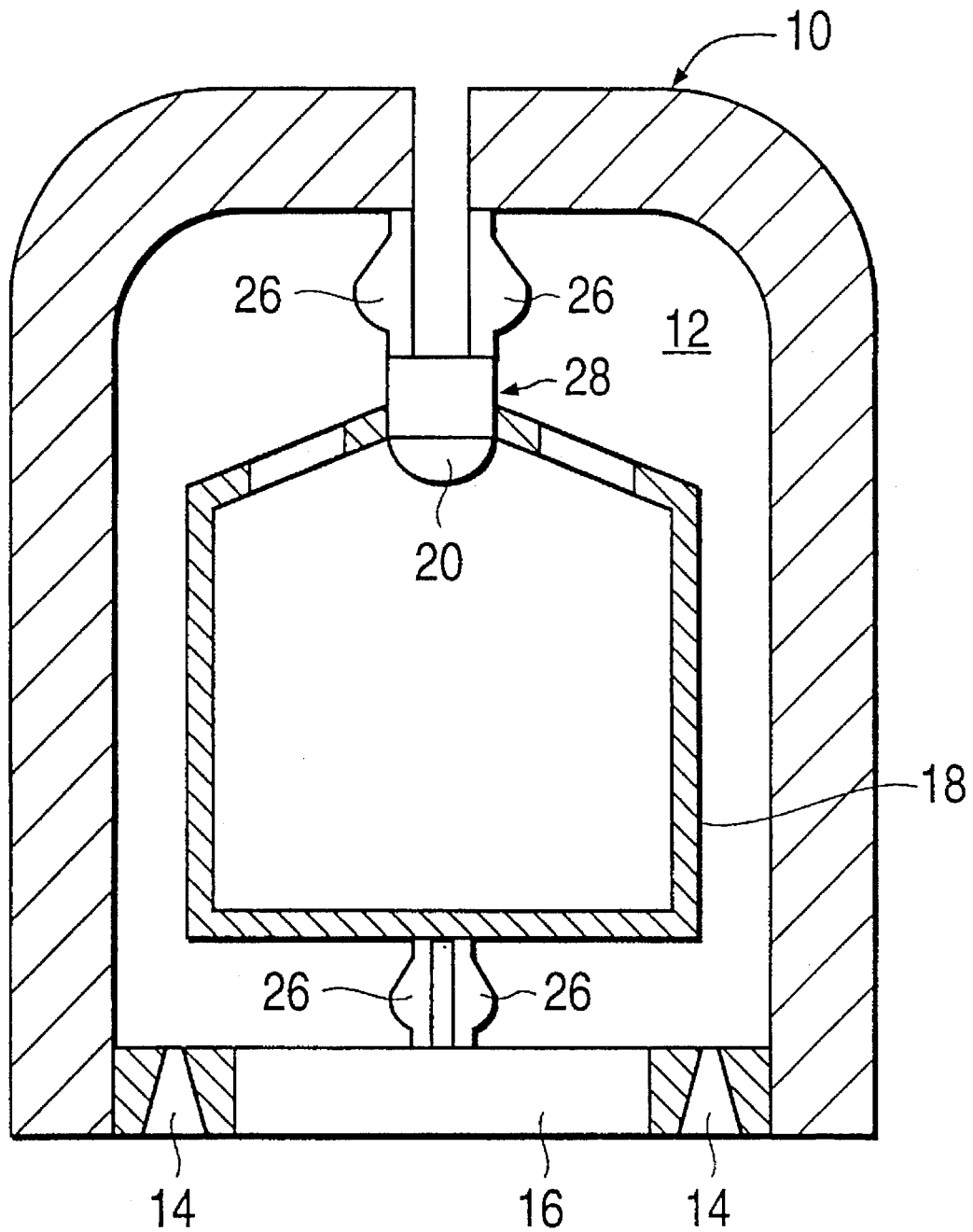

An alternative embodiment of a reactor according to the invention is shown in FIG. 2. This differs from the embodiment described above in that exhaust vents 14 are provided in the base 16 and the main and secondary nozzles 20, 26 are provided in a single body 28 above the can 18. Further secondary nozzles 26 are provided below the can 18 for further dilution of the combustion products.

Figure 3:
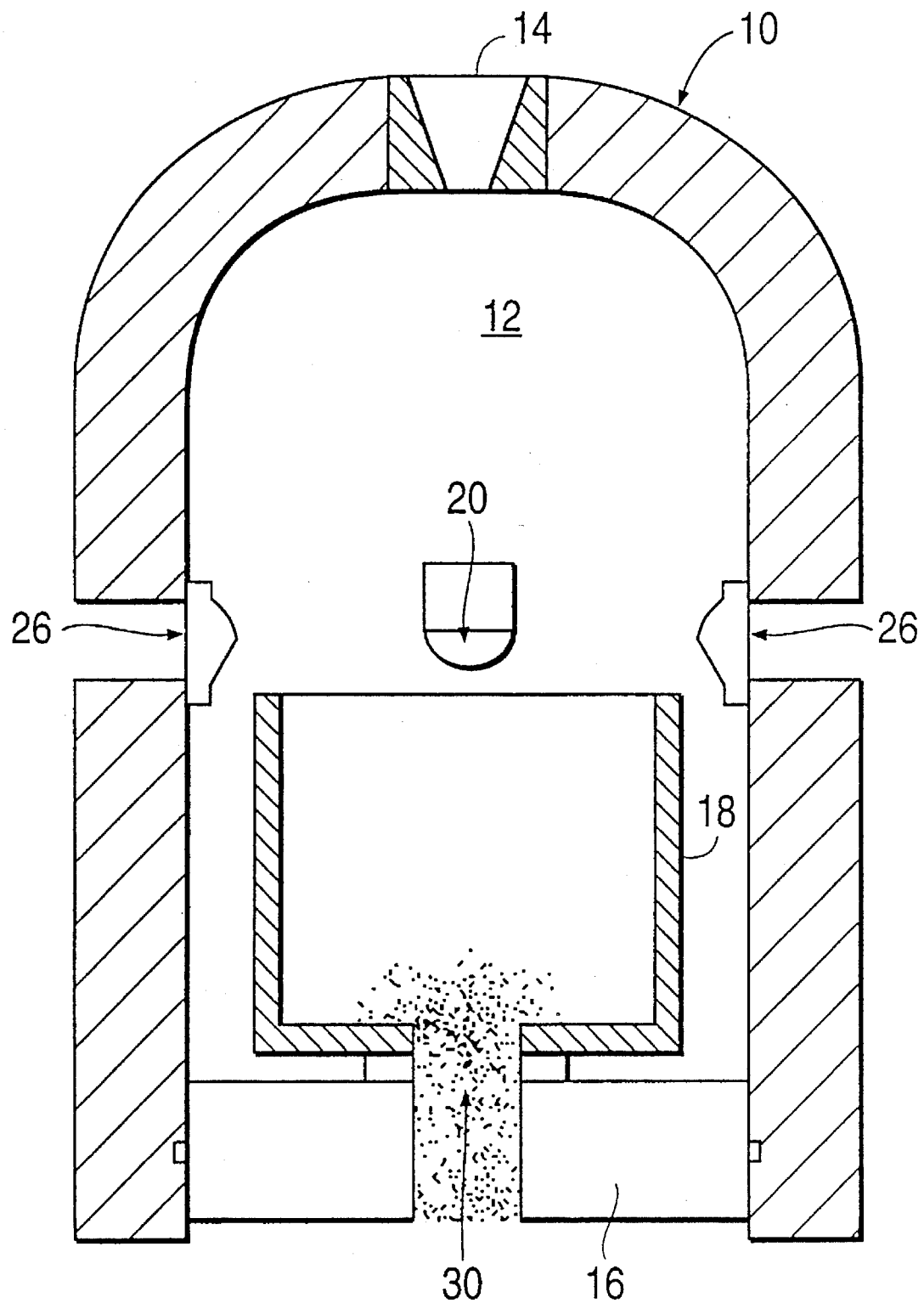
Figure 4:
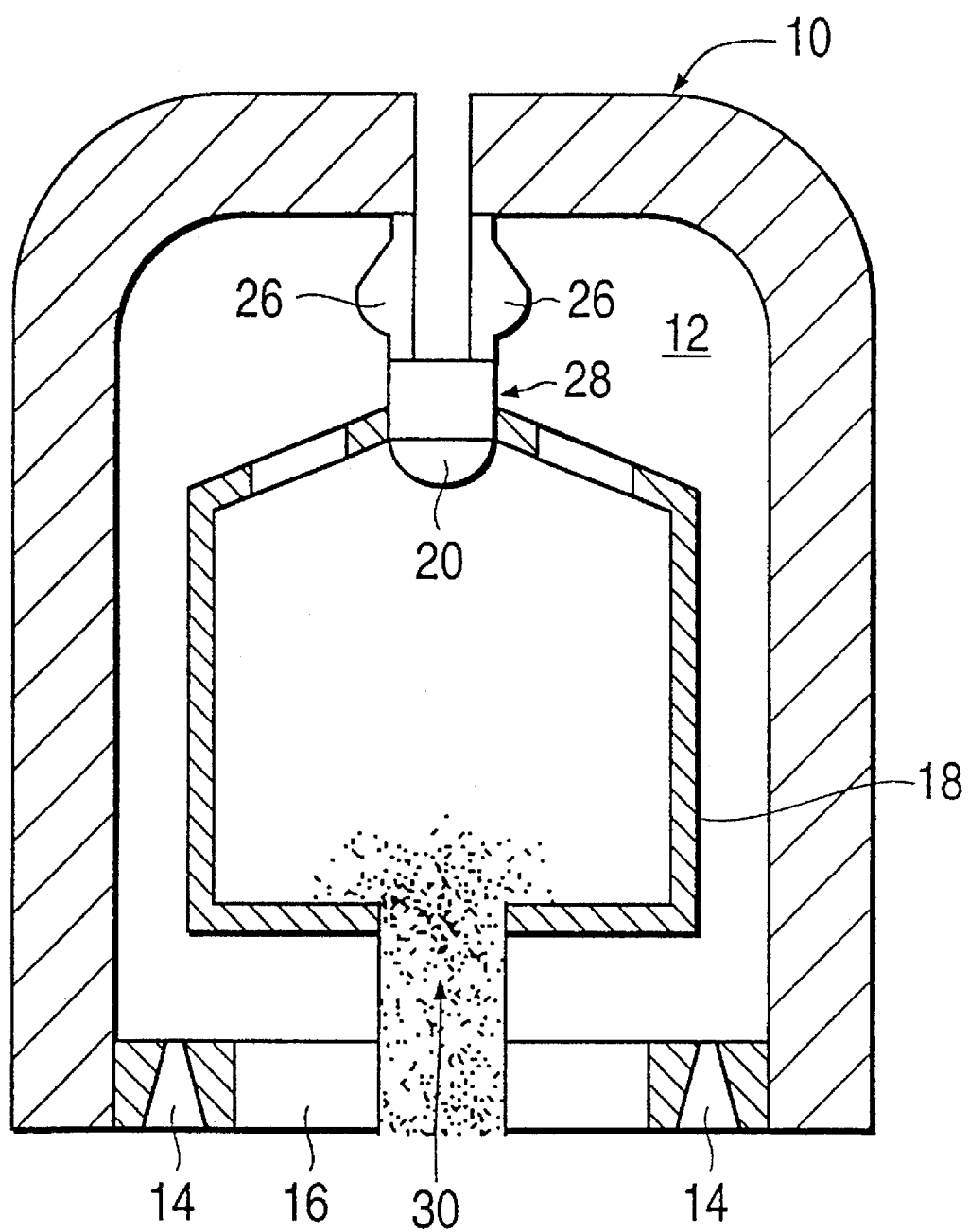

The embodiments shown in FIGS. 3 and 4 correspond to modifications of the embodiments of FIGS. 1 and 2 respectively. In each case, the can 18 is connected to a passage 30 which allows fresh fuel to be introduced into the can 18 to sustain combustion. In the case of FIG. 4, the further secondary nozzles 26 below the can 18 are absent but otherwise the features are as described above.

Figure 5:
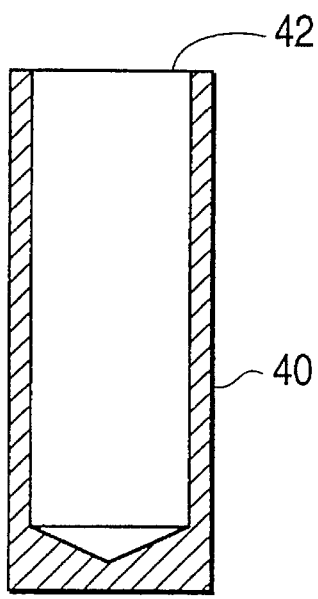
FIGS. 5 and 6 shown alternative forms of container for a lithium charge for use in the reactor of FIG. 1, 2, 3, and 4.
Figure 6:
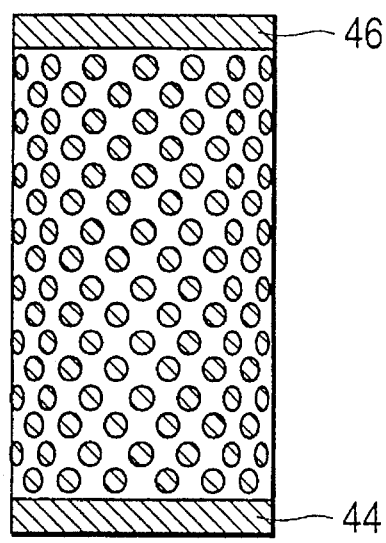

Two alternative forms of fuel charge are shown in FIG. 5 and 6. In FIG. 5, the charge comprises a solid walled stainless steel cannister 40 having an open top 42. The lithium fuel is provided within this cannister 40. In FIG. 6, the cannister has an open mesh structure 44 enclosing the lithium fuel 46. The mesh is selected so as to allow water and reaction products to escape in use but to confine the lithium in a discrete body, even if molten or partially molten. The fuel charge typically comprises a solid body of lithium which can be provided with a combustion initiator such as a pyrotechnic device on the surface thereof. The initiator can comprise lithium particles in a sodium matrix and can include potassium metal or ammonium nitrate crystals. The charge can comprise lithium particles in a slurry. Furthermore, a stabiliser such as aluminium particles or aluminium wire can be included in the lithium charge which will also assist in heat transfer and generation as well as stabilising the charge dimensionally. In the embodiments of FIGS. 3 and 4, the use of cannisters is unnecessary and the fuel slurry is pumped directly into the can 18.

In use, water is sprayed from the nozzle 20 onto the charge in the can 18. If a pyrotechnic initiator is present, this is usually ignited about 4–5 seconds before the spray begins and combustion is initiated. The hot combustion gases and steam generated by the action of the secondary sprays are exhausted from the vent 14 where they are typically used to drive a motor for a marine device such as a torpedo. In such cases, the surrounding water, seawater can be used to react with the lithium. In the case of FIGS. 3 and 4, the fresh lithium is pumped into the can to sustain the reaction.

By providing the lithium in a discrete body, even when in a slurry state by use of the can 18, the problems associated with spraying molten lithium are avoided.

In an alternative embodiment of the invention, the fuel is provided as a layer around the inside of the combustion chamber liner.

It will be appreciated that various changes can be made within the scope of the invention.

We claim:

1. A reactor comprising: a combustion chamber; a charge comprising a discrete body of one of lithium and an easily oxidisable metal disposed inside the chamber; first means for introducing water from outside the chamber onto said charge so as to cause combustion of said charge; and second means for introducing water into the chamber to mix with the combustion products of the reaction of said charge and the water from said first means and to produce steam.

2. A reactor as claimed in claim 1 wherein a combustion initiator is provided.

3. A reactor as claimed in claim 2 wherein the initiator is provided on the surface of the charge.

4. A reactor as claimed in claim 3 wherein the initiator is a pyrotechnic device.

5. A reactor as claimed in claim 3 wherein the initiator consists of lithium particles in a sodium or potassium matrix or consists of ammonium nitrate crystals.

6. A motor as claimed in claim 1 wherein the charge is a lithium charge which is provided as a coating on an inner wall of the chamber.

7. A reactor as claimed in claim 1 wherein said first means comprise at least one nozzle for directly impinging water onto said charge and said second means comprises at least one further nozzle for spraying water into the chamber.

8. A reactor as claimed in claim 1 wherein: the charge comprises lithium the lithium is provided in a permeable container which will allow water and combustion products to drain away whilst retaining any molten lithium.

9. A reactor as claimed in claim 1 wherein: the charge comprises lithium means are provided for introducing fresh lithium into the chamber during combustion.

10. A reactor as claimed in claim 9 wherein the lithium is introduced in a liquid slurry which is either reactive or inert.

11. A reactor as claimed in claim 1 wherein the charge is a lithium charge which also includes aluminium in the form of particles or wire.

* * * * *